UNITED STATES PATENT OFFICE

WILLIAM H. SMITH, OF DETROIT, MICHIGAN, ASSIGNOR TO GENERAL REDUCTION CORPORATION, OF DETROIT, MICHIGAN, A CORPORATION OF DELAWARE

METALS REDUCED FROM THEIR OXIDES WITHOUT MELTING

No Drawing.   Application filed October 22, 1929.   Serial No. 401,607.

This invention relates to metals reduced from their oxides without melting, and has to do particularly with the subsequent treatment of the reduced oxides to produce a substantially pure iron with low carbon content, and the treatment and recovery of gangue in the reduced iron by fluxing at temperatures below the melting temperature of iron.

In my prior application Serial No. 385,478 filed August 12, 1929, I have disclosed the process of removing and recovering gangue from metals reduced from their ores without melting whereby the slag can be completely separated from the ore by the adding of certain ingredients which attack and combine with the gangue at temperatures lower than the melting point of the iron.

The present process has to do particularly with the treatment of that type of iron known as "sponge" iron which is a finely divided iron produced by reducing iron oxide without melting. It is known that compounds of phosphorous, silica, sulphur and other foreign ingredients, which are generally termed gangue, remain associated with the iron after reduction and before the iron has become molten. It is also known that in the steel making art and in the process of making pig iron the removing of carbon makes it possible for many other errors to creep in because with such process a high temperature is present and the carbon reduces the various foreign ingredients such as compounds of phosphorus, manganese, etc., into their pure metal which combines directly with the iron at such time.

It is the object of the present invention to so treat and reduce sponge iron as to completely remove all carbon remaining in the sponge iron thus making it impossible to reduce the phosphorous compound and similar gangue. The present invention also has to do with the adding of a "fluxing" agent or other compounds such as sodium carbonate to the sponge iron and the forming of the same into suitable briquets.

In the preferred process of reducing iron oxides without melting, it is customary to have a surplus of carbon present and while this surplus may vary in different processes and with different ingredients, a certain amount of carbon will always be present in the reduced sponge iron. Phosphorous, as it exists in this reduced sponge iron, will be reduced by carbon to the pure metal at approximately 2500° F. In order to positively prevent such reduction I preferably form the fine sponge iron into briquets and heat the same to a sintering temperature up to approximately 2000° F. or below the reduction temperature of phosphorous. There will be a certain amount of FeO remaining in the reduced oxide, or if necessary, a small amount of FeO may be added to the mixture before forming the briquet. At any rate, a small amount of FeO is present in the briquet and this small amount is sufficient to take up the carbon when the briquet is raised to a reducing temperature. This FeO will thus take up all the carbon and preferably a small surplus of FeO will remain in the briquet. It will thus be seen that if the briquet is then raised to melting temperature that the foreign ingredients such as phosphorous will not be in their pure state, and will thus be prevented from readily going with the iron.

This removal of carbon from the briquet may be carried on by the reducing or sintering step above set forth, or by "holding up" the heat less than the melting temperature of Fe in case that the briquets are to be melted during the same operation. In other words, instead of gradually raising the heat to a melting temperature I prefer to "hold up" the applied heat to a reducing temperature, below the melting point of the iron, until substantially all the carbon has been used up in the reduction of the surplus FeO.

It will thus be seen that I am able to obtain a low carbon iron and that the steps I utilize for obtaining this low carbon prevents the reduction of the metallic oxides existing as gangue, to thereby insure the obtaining of substantially pure low carbon iron.

To completely separate the gangue and the iron and, in particular, to neutralize the phosphorous, I preferably add what might be termed suitable "fluxing" materials that "flux" below the melting point of Fe, or what might be termed other gangue, to the mixture whereby to combine with the gangue already in the reduced iron and materials lower than the melting point of such gangue in the iron for the purpose of making such oxides in the iron fluid whereby they will rise with the slag in the container. This general method is disclosed in my said application No. 385,478. In such application I particularly disclose the use of sodium carbonate as the additional "fluxing" agent or gangue for "dissolving" or freeing the gangue remaining in the iron when reduced.

The amount of sodium carbonate added in the process disclosed in said application preferably was about double the amount of gangue present in the iron. As sodium carbonate is relatively expensive it will be seen that the treating and recovering of gangue by this method, while very advantageous and desirable, requires a relatively large amount. I have discovered that if the added gangue, such as sodium or potassium carbonate, is added to the iron mixture and the same is formed into briquets that a very much lower quantity of sodium or potassium carbonate is required.

By actual tests I have found that by forming the sponge iron into briquets that the quantity of sodium or potassium carbonate required is only about one-fifth of the gangue present in the briquets in contrast to double the amount of gangue when the sponge iron is treated in loose form.

In place of sodium carbonate it will be understood that I may use a mixture of silica and calcium oxide together in crystal form, or calcium fluorid or fluorspar, or other oxide compounds that flux under the melting point of Fe. The adding of lime to the briquet will not affect the gangue because the lime melts at about 3000° F. or over, which is above the melting point of iron. The same is true with silica. By combining the silica and calcium oxide the melting point is lowered to around 2400° with the result that such added silica and calcium oxide will combine with the gangue before the melting point of the iron is reached.

When using sodium or potassium carbonate I preferably mix the same in with the sponge iron before forming the briquets. However, if desired, it will be understood that such sodium or potassium carbonate may be positioned in the form of powder on the outside of the briquets and when the briquets are raised to a sintering temperature will be absorbed into the briquet to perform the same function as if such added "fluxing" agent formed a part of the briquet itself.

Where I use the term FeO it will be understood that this term will include iron oxide in general in the forms FeO, $Fe_2O_3$, or $Fe_3O_4$.

What I claim is:

1. The method of treating and recovering gangue from metals reduced from their oxides without melting which comprises mixing a "fluxing" agent, having a fluxing temperature below the melting point of iron with the finely divided reduced metal, forming the same into briquets and subjecting the briquets to temperatures less than the melting point of the metal.

2. The method of treating and recovering gangue from metals reduced from their oxides without melting, which comprises mixing a "fluxing" agent, having a fluxing temperature below the melting point of iron, with the finely divided reduced metal, forming the same into briquets, and subjecting the briquets to temperature sufficient to cause the gangue in the briquets to combine with the added gangue, while still in briquet form.

3. The method of treating metals reduced from their oxides without melting, which comprises adding alkali metal carbonate of the type having a fluxing temperature below the melting point of iron as a "fluxing" agent to the mixture in a quantity measurably less than the amount of gangue in the reduced metal, forming the same into a briquet and then subjecting the mixture to a temperature less than the melting point of the metal whereby the gangue in the reduced metal combines with the "fluxing" agent.

4. The method of treating metals reduced from their oxides without melting, which comprises adding alkali metal carbonate of the type having a fluxing temperature below the melting point of iron as a "fluxing" agent to the mixture in a quantity measurably less than the amount of gangue in the reduced metal, forming the same into a briquet and then subjecting the mixture to a temperature less than the melting point of the metal whereby the gangue in the reduced metal combines with the "fluxing" agent, and then subjecting the briquet to a melting temperature whereby the combined gangue will rise with the slag.

5. The steps in the method of treating and recovering gangue from metals reduced from their oxides without melting, and of the type wherein a surplus of carbon is present in the reduced metal, which comprises forming the reduced metal and carbon together with a surplus of metallic oxide into a briquet and then raising it to a temperature sufficient to cause reduction of the metallic oxide by the carbon whereby to substantially remove all of the carbon from the briquet.

6. The steps in the method of treating and recovering gangue from metals reduced from their oxides without melting, and of the type containing a surplus of carbon and a small amount of phosphorous, which comprises forming said reduced metal into briquets having a predetermined amount of metallic oxide present, subjecting the briquets to a reducing temperature less than the melting point of the iron whereby to cause reduction of the metallic oxide by the carbon and thereby removing substantially all of the carbon, without reducing the phosphorous.

7. The method of treating metals reduced from their oxides without melting, of the type having a surplus of carbon and a certain amount of gangue including phosphorous, which comprises mixing a "fluxing" agent with the mixture and insuring a predetermined amount of iron oxide in the mixture, briquetting the mixture, and subjecting the same to a temperature less than the melting point of iron whereby the carbon is substantially removed by reducing the iron oxide, the remaining gangue in the briquet combining with the added gangue whereby to go off with the slag when the briquet is raised to a melting temperature.

8. The method of treating metals reduced from their oxides without melting, of the type having a surplus of carbon present and a small amount of phosphorous, which comprises forming the reduced metal and a fluxing agent into briquets having a predetermined amount of iron oxide present, raising the briquets to a temperature sufficient to cause reduction of the iron oxide by the carbon, and holding said temperature until substantially all of the carbon is removed by said reduction of the iron oxide, allowing the gangue in the reduced metal to combine with the "fluxing" agent at a point below the melting point of the iron and then allowing the temperature to continue to melt the briquet.

In testimony whereof I affix my signature.

WILLIAM H. SMITH.